(12) United States Patent
Kojo

(10) Patent No.: US 9,389,093 B2
(45) Date of Patent: Jul. 12, 2016

(54) TRAFFIC SIGNAL RECOGNITION APPARATUS

(71) Applicant: NISSAN MOTOR CO., LTD., Yokohama-shi, Kanagawa (JP)

(72) Inventor: Naoki Kojo, Tokyo (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/782,072

(22) PCT Filed: Feb. 25, 2014

(86) PCT No.: PCT/JP2014/054435
§ 371 (c)(1),
(2) Date: Oct. 2, 2015

(87) PCT Pub. No.: WO2014/162797
PCT Pub. Date: Oct. 9, 2014

(65) Prior Publication Data
US 2016/0054138 A1 Feb. 25, 2016

(30) Foreign Application Priority Data

Apr. 4, 2013 (JP) .................................. 2013-078368

(51) Int. Cl.
*G08G 1/16* (2006.01)
*G01C 21/36* (2006.01)
(Continued)

(52) U.S. Cl.
CPC ............ *G01C 21/3602* (2013.01); *B60R 11/04* (2013.01); *G06K 9/00791* (2013.01); *G06K 9/00798* (2013.01); *G06K 9/00818* (2013.01);
(Continued)

(58) Field of Classification Search
CPC ............ G08G 1/16; G01C 21/26; G06T 1/00; G06T 7/60; G06K 9/52; B60K 11/04
USPC ............... 701/423, 25, 117, 118; 342/357.09; 348/119
See application file for complete search history.

(56) References Cited

U.S. PATENT DOCUMENTS

| 6,018,697 A | 1/2000 | Morimoto et al. |
| 6,191,704 B1 | 2/2001 | Takenaga et al. |

(Continued)

FOREIGN PATENT DOCUMENTS

| JP | 11306489 A | 11/1999 |
| JP | 3857698 B2 | 9/2006 |

(Continued)

*Primary Examiner* — Tan Q Nguyen
(74) *Attorney, Agent, or Firm* — Young Basile Hanlon & MacFarlane, P.C.

(57) ABSTRACT

A traffic signal recognition apparatus includes a control device that executes: a captured image acquisition function which acquires a captured image around an own vehicle; an own vehicle position acquisition function which acquires a current position of the own vehicle; a target traffic signal specifying function which refers to map information to specify a traffic signal to be targeted in a traveling link for the own vehicle, the traffic signal data including position information about the traffic signal related to the traveling link; a traffic signal image area extraction function which extracts an image area of the traffic signal on the basis of the position information about the traffic signal and image capturing property information about the camera; and a traffic signal content recognition function which recognizes a traffic signal content of the traffic signal on the basis of an image of the traffic signal in the image area.

7 Claims, 6 Drawing Sheets

(51) Int. Cl.
  *G08G 1/0962* (2006.01)
  *G06K 9/00* (2006.01)
  *B60R 11/04* (2006.01)
  *G06K 9/52* (2006.01)
  *G06T 7/00* (2006.01)
  *G06T 7/60* (2006.01)
  *H04N 5/232* (2006.01)
  *G01C 21/26* (2006.01)
  *G06K 9/46* (2006.01)

(52) U.S. Cl.
  CPC ............... *G06K 9/52* (2013.01); *G06T 7/0042* (2013.01); *G06T 7/60* (2013.01); *G08G 1/09623* (2013.01); *G08G 1/09626* (2013.01); *H04N 5/23296* (2013.01); *G06K 2009/4666* (2013.01); *G06T 2207/30256* (2013.01)

(56) References Cited

U.S. PATENT DOCUMENTS

| | | | |
|---|---|---|---|
| 2007/0055443 A1 | 3/2007 | Sumizawa et al. | |
| 2009/0303077 A1* | 12/2009 | Onome | G08G 1/096716 340/901 |
| 2010/0100268 A1* | 4/2010 | Zhang | B60W 30/09 701/25 |
| 2015/0262483 A1* | 9/2015 | Sugawara | G08G 1/0962 340/929 |

FOREIGN PATENT DOCUMENTS

| | | |
|---|---|---|
| JP | 2007071581 A | 3/2007 |
| JP | 2007178223 A | 7/2007 |
| JP | 2008293277 A | 12/2008 |
| JP | 2013029378 A | 2/2013 |
| WO | 2007102065 A1 | 9/2007 |

* cited by examiner

Fig. 2

| | | Map information (41) | | | | | |
|---|---|---|---|---|---|---|---|
| Point | Latitude/ Longitude | | | | | | |
| Node (ID) | Latitude/ Longitude/ Height | Connected node | Branched node | | | | |
| Traveling link (ID) | Latitude/ Longitude/ Height/ Slope | Start point node/ End point node | Traveling direction (Right turn/ Left turn/ Straight ahead) | Categorization (Junction/ Branching) | Connected link | Branched link | Targeted traffic signal (ID) |
| Traffic signal (ID) | Latitude/ Longitude | Objected link | Height | | Categorization information | | |
| POI | Latitude/ Longitude | Attribute | | | | | |

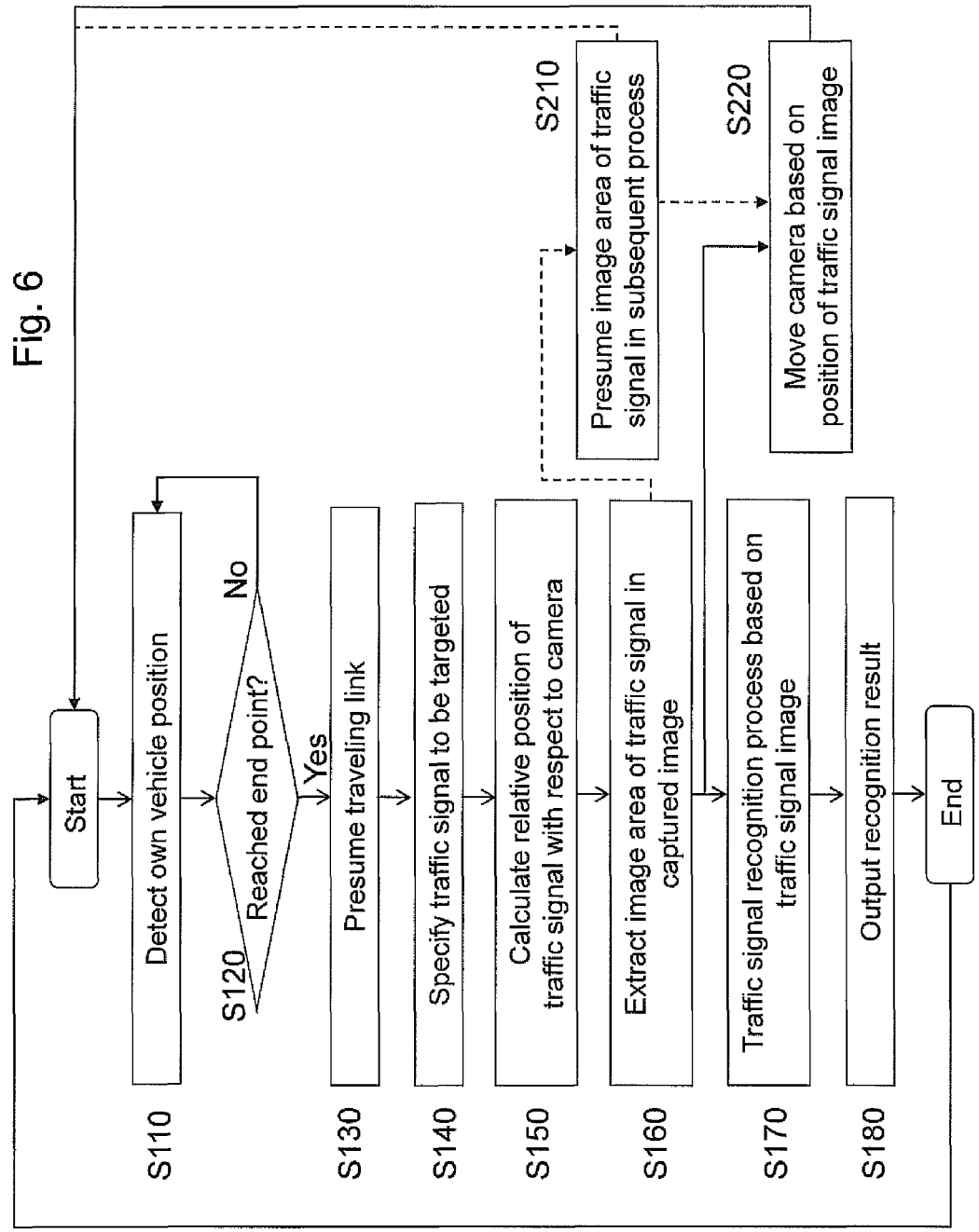

TRAFFIC SIGNAL RECOGNITION APPARATUS

CROSS REFERENCE TO RELATED APPLICATION

The present application claims priority to Japanese Patent Application No. 2013-078368, filed Apr. 4, 2013, incorporated herein in its entirety.

TECHNICAL FIELD

The present invention relates to a traffic signal recognition apparatus which specifies a traffic signal to be targeted on a traveling road for an own vehicle and recognizes the content of the traffic signal.

BACKGROUND

With regard to this kind of apparatus, an apparatus which recognizes a status of a traffic signal is known. This apparatus presumes an image area which includes an image of the traffic signal within a captured image by a camera on the basis of the distance from the own vehicle to an intersection and height information about a traffic signal. And, this apparatus recognizes the content of the traffic signal on the basis of an image of the image area of the traffic signal (See following Japanese Patent No. 3857698).

However, in the case that several traffic signals are provided at an intersection, some troubles may occur. For example, a trouble such as that an image of a traffic signal which should not be targeted by the own vehicle is captured in the captured image by an on-vehicle camera may occur. Another trouble such that an image of a traffic signal which should be targeted is not captured may occur. These troubles may depend on the difference under situation due to the traveling direction of the own vehicle, the traffic lanes, the traveling direction or the like. Therefore, the method according to the prior art has a problem in which the own vehicle may erroneously specify a traffic signal to be targeted and incorrectly recognize the traffic signal content presented by the traffic signal.

SUMMARY

An object of the present invention is to provide a traffic signal recognition apparatus which specifies one traffic signal to be targeted by the own vehicle and recognizes the content of the traffic signal with a high accuracy, even when troubles occurs, such as that an image of a traffic signal which should not be targeted is captured in the captured image by an on-vehicle camera, or an image of a traffic signal which should be targeted is not captured in the captured image by the on-vehicle camera.

The traffic signal recognition apparatus of the present invention refers to map information to specify a traffic signal to be targeted when traveling on the next traveling link, on the basis of a traveling link to which the current position of the own vehicle belongs. The map information includes traveling link data and traffic signal data. The traveling link data is defined for each traffic lane by a directed link. The traveling link data includes a connected link and traveling direction information which are related to each other. The traffic signal data is related to the traveling link data.

According to the present invention, the map information includes the traveling link data and the traffic signal data which are related to each other. The traveling link is specified for each traffic lane by using the directed link including a start point, an end point and an up direction or a down direction, and the traveling link is related to the connected link and the traveling direction information. The traffic signal data includes date concerning a traffic signal to be targeted when traveling on the traveling link. The map information is thus used to specify the traffic signal to be targeted when traveling on each traveling link. Therefore, even in a complex traffic situation in which several traffic signal are provided, one traffic signal to be targeted by the driver can be correctly specified in the traveling link for the own vehicle.

BRIEF DESCRIPTION OF THE DRAWINGS

FIG. 2 is a view showing an example of map information according to the present embodiment;

FIG. 6 is a flowchart showing a control procedure of the driving support system according to the present embodiment.

DETAILED DESCRIPTION OF THE EMBODIMENTS

Hereinafter, an embodiment of the present invention will be described with reference to the drawings. The present embodiment exemplifies an example in which the traffic signal recognition apparatus according to the present invention is applied to a driving support system.

Figure 1:
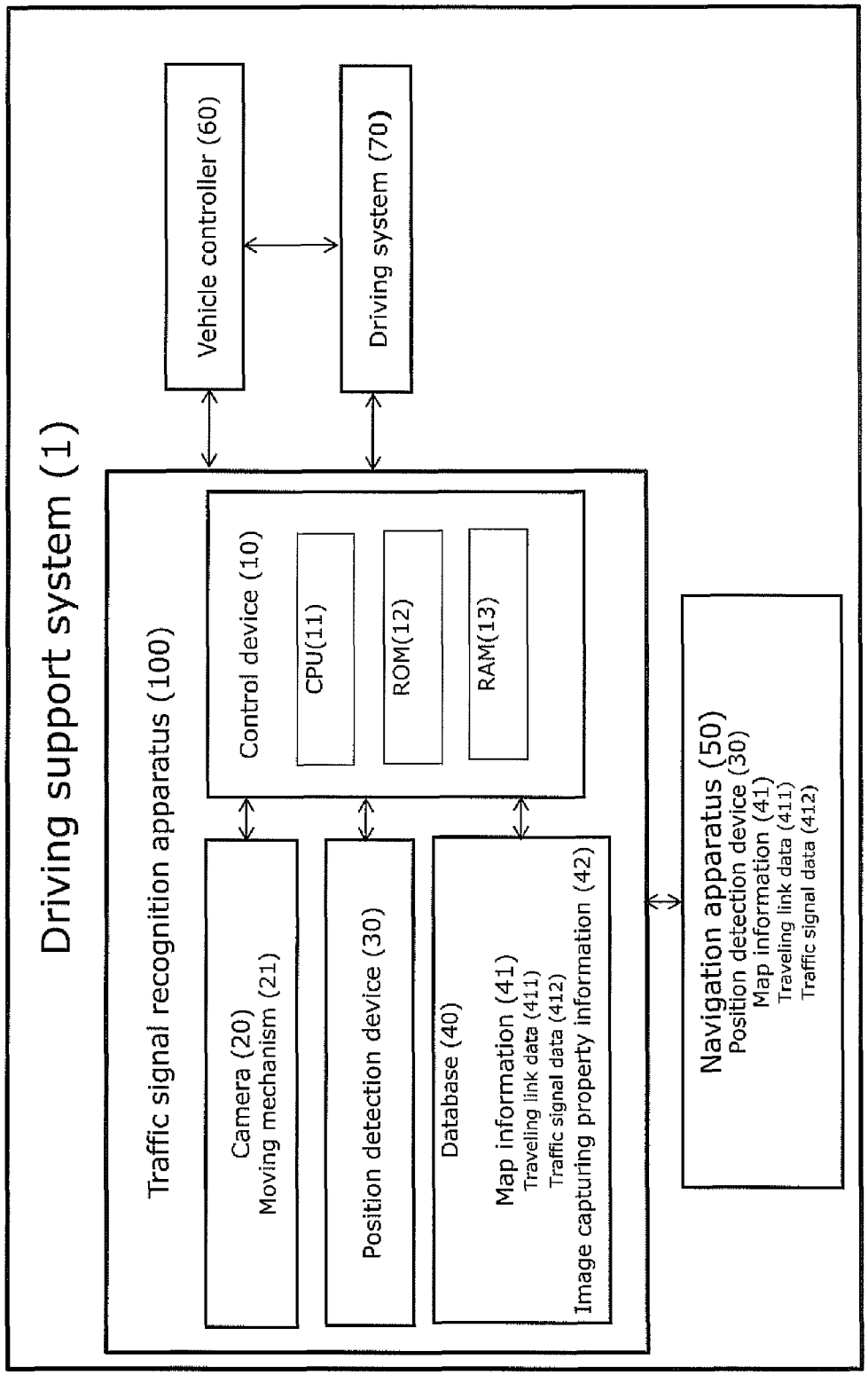
FIG. 1 is a block diagram of a driving support system according to an embodiment of the present invention.

FIG. 1 is a block diagram of a driving support system 1 comprising a traffic signal recognition apparatus 100 according to the present invention. The driving support system 1 and the traffic signal recognition apparatus 100 included therein are equipped in a vehicle. The traffic signal recognition apparatus 100 specifies a traffic signal to be targeted by a driver in the own vehicle and recognizes the content of information presented by the traffic signal.

The driving support system 1 comprises the traffic signal recognition apparatus 100, a navigation apparatus 50, a vehicle controller 60, and a driving system 70 which controls vehicle driving. The driving support system 1 controls driving/braking of the own vehicle via the vehicle controller 60 and the driving system 70 on the basis of signal content recognized by the traffic signal recognition apparatus 100. The driving support system 1 provides the driver of the own vehicle with supporting information for driving via the navigation apparatus 50.

As shown in FIG. 1, the traffic signal recognition apparatus 100 of the present embodiment comprises a control device 10, a camera 20, a position detection device 30, and a database 40.

The camera 20, which is mounted on the own vehicle, captures an image around the own vehicle. For example, the camera 20 is a camera which includes an image capturing element such as CCD. The lens used therein may be a telescopic lens having a narrow angle of view to be capable of capturing an image of a distant preceding vehicle. The lens may also be a fisheye lens having a wide field of view to respond to a curve and a slope change. A lens for omnidirectional cameras, which can capture images of all-round views, may also be used. The position to which the camera 20 is attached is not limited, but in the present embodiment, the camera 20 is provided to face forward in the vicinity of an interior rearview mirror of the own vehicle. An example will be described which uses a standard lens having an angle of view of about 25° to 50°. Image capturing property information 42, which includes internal parameters such as lens distortion of the camera 20 and external parameters which represent the attaching position to the vehicle, may be preliminarily stored in a ROM.

The camera 20 in the present embodiment has a zoom function which increases and decreases an image capturing magnification when capturing an image. The zoom function in the present embodiment includes a control function of the image capturing magnification being controlled on the basis of a surface ratio of the image area of a specified traffic signal with respect to the captured image, which will be described later.

The camera 20 in the present embodiment includes a moving mechanism 21. The moving mechanism 21 can vary the imaging direction of the camera 20. The moving mechanism 21 in the present embodiment has a driving function, and the camera 20 can be driven in the vertical direction of the own vehicle by the driving function. The moving mechanism 21 may be configured as a supporting device separate from the camera 20. The camera 20 used in the present embodiment is a moving mechanism-integrated camera such as a PTZ camera (a camera capable of Pan/Tilt/Zoom) which has a mechanism to rotationally drive the camera body. The camera 20 may be, but is not particularly limited to, a PTZ camera disposed on an upper surface of a dashboard in the own vehicle so that the camera can capture an image viewed forward from the own vehicle. The specific form of the moving mechanism 21 is not particularly limited, and may employ a method of providing a mirror in front of the image capturing element and driving the mirror thereby to vary the imaging direction. The external parameters including the attaching position of the camera 20 to the vehicle, and other parameters including the varying amount of the attaching position of the camera 20 due to operation of the moving mechanism 21, may be preliminarily calculated and stored in the database 40. The moving mechanism 21 in the present embodiment varies the imaging direction of the camera 20 on the basis of the position of the image area of a specified traffic signal with respect to the captured image.

The position detection device 30, which comprises a GPS (Global Positioning System), detects a current position (latitude/longitude) of a vehicle which is traveling. The current position of the own vehicle can be acquired from the position detection device 30 included in the navigation apparatus 50 which is mounted in the own vehicle. The position detection device 30 in the present embodiment has a function of detecting an attitude of the own vehicle. To detect the attitude of the own vehicle, the position detection device 30 may comprise two GPS receivers and calculate the direction of the own vehicle. This position detection device 30 may further comprise an azimuth meter to calculate the direction of the own vehicle.

The position detection device 30 may calculate the attitude of the own vehicle on the basis of the captured image by the camera 20. An example will be described of a method when calculating the attitude of the own vehicle on the basis of the captured image. When the own vehicle is traveling on a straight road, the viewpoint for the captured image by the camera 20 is set above the vehicle, and the captured image is converted into bird's-eye view image in which the own vehicle is viewed from the viewpoint above the vehicle. If lines (lane markings) or curbs are recognized in the bird's-eye view image, the inclination of the lines or curbs can be used to calculate the direction of the vehicle. The position/attitude of the own vehicle may be calculated using SLAM (Simultaneous Localization and Mapping) which is a self-location presumption technique using an image and which has been known in the art at the time of filing of the present application. Specifically, three-dimensional positions of image feature points may be preliminarily stored in the database 40, and image feature points in the captured image by the camera 20 can be compared for verification with the image feature points stored in the database 40 thereby to calculate the position/attitude of the own vehicle.

The database 40 stores map information 41. The map information 41 may alternatively be stored in the navigation apparatus 50 which is accessible by the control device 10. The map information 41 in the present embodiment includes traveling link data 411 and traffic signal data 412 which is associated with the traveling link data 411.

Each traveling link in the traveling link data 411 is defined for each traffic lane by a directed link which includes a start point, an end point and an up direction or a down direction. The directed link is defined at least by the start point and the end point (i.e., the length) and information about the direction. Each traveling link (directed link) in the present embodiment is further related to a connected link which is connected with each of the start point and the end point, and also related to traveling direction information which specifies a traveling direction including straight ahead or right or left turn. In addition, the traffic signal data is related to the traveling link. The traffic signal data is data which includes position information about a traffic signal to be targeted by the driver when traveling on each traveling link.

FIG. 2 shows an example of the map information 41. As shown in FIG. 2, the map information 41 in the present embodiment includes:
points each specified by map coordinate values, such as latitude and longitude, as in ordinary map information;
nodes each assigned an identifier (ID);
traveling links each assigned an identifier (ID);
traffic signals each assigned an identifier (ID); and
point of interest (POI) information related to each point.

Information about a node is specified by the map coordinate values and has an identifier of a node to be connected with the node and identifiers of nodes at branched parts. A node may be set at the center of the width direction of a traffic lane, but in a complex intersection and the like having a plurality of traffic lanes, the position of a node may be defined utilizing a trace on which a vehicle has actually traveled.

The traveling link data includes:
an identifier of a node which is specified by the map coordinate values and defines the start and end points;
a traveling direction, such as straight line, right turn and left turn, of each traveling link;
categorization of each traveling link, i.e., whether the traveling link is a junction link or a branching link (a link to be join or a link to be branched); and
an identifier of another traveling link which is connected to the traveling link; and
identifiers of a plurality of traveling links at branched parts.

The identifier of a traffic signal to be targeted is related to each traveling link. The traveling link data in the present embodiment is assigned a different ID for each traffic lane even when the lanes are present on the same road, and treated as a different traveling link. This allows a traveling link for right turn and a traveling link for straight ahead to be processed as different traveling links even on the same road. Thus, even when the information about the start point and end point is the same, the traffic signal to be targeted on the traveling link for right turn and the traffic signal to be targeted on the traveling link for straight ahead are different, and therefore stored as different information items. According to the present embodiment, traveling links are defined as different traveling links when a traveling road for vehicles is branched or traveling roads intersect with each other and when traffic signals to be targeted are different. That is, in the traveling link information according to the present embodiment, the traveling link is defined for each traffic lane, and one traffic signal to be targeted is related to one traveling link. Therefore, even when several traffic signals are provided on the same traveling road, the several traffic signals are not related to one traveling link in the traveling link data according to the present embodiment. When a traveling link is determined for the own vehicle to travel, the traffic signal to be targeted can be uniquely specified because one traffic signal to be targeted is related to one traveling link which is defined for each traffic lane.

The traffic signal data includes:
height information;
an installation position specified by the map coordinate values;
an identifier of a traveling link having a traffic signal to be targeted by a vehicle which is traveling on the traveling link, i.e., an identifier of a traveling link which is controlled by the traffic signal; and
categorization information about the traffic signal.

The categorization information about the traffic signal as referred to herein is information that the traffic signal is a traffic signal which displays red color, yellow color or green color, the traffic signal is a traffic signal which displays red color or green color for pedestrians, or the traffic signal is a traffic signal which displays right and left turns by arrows.

Figure 3:
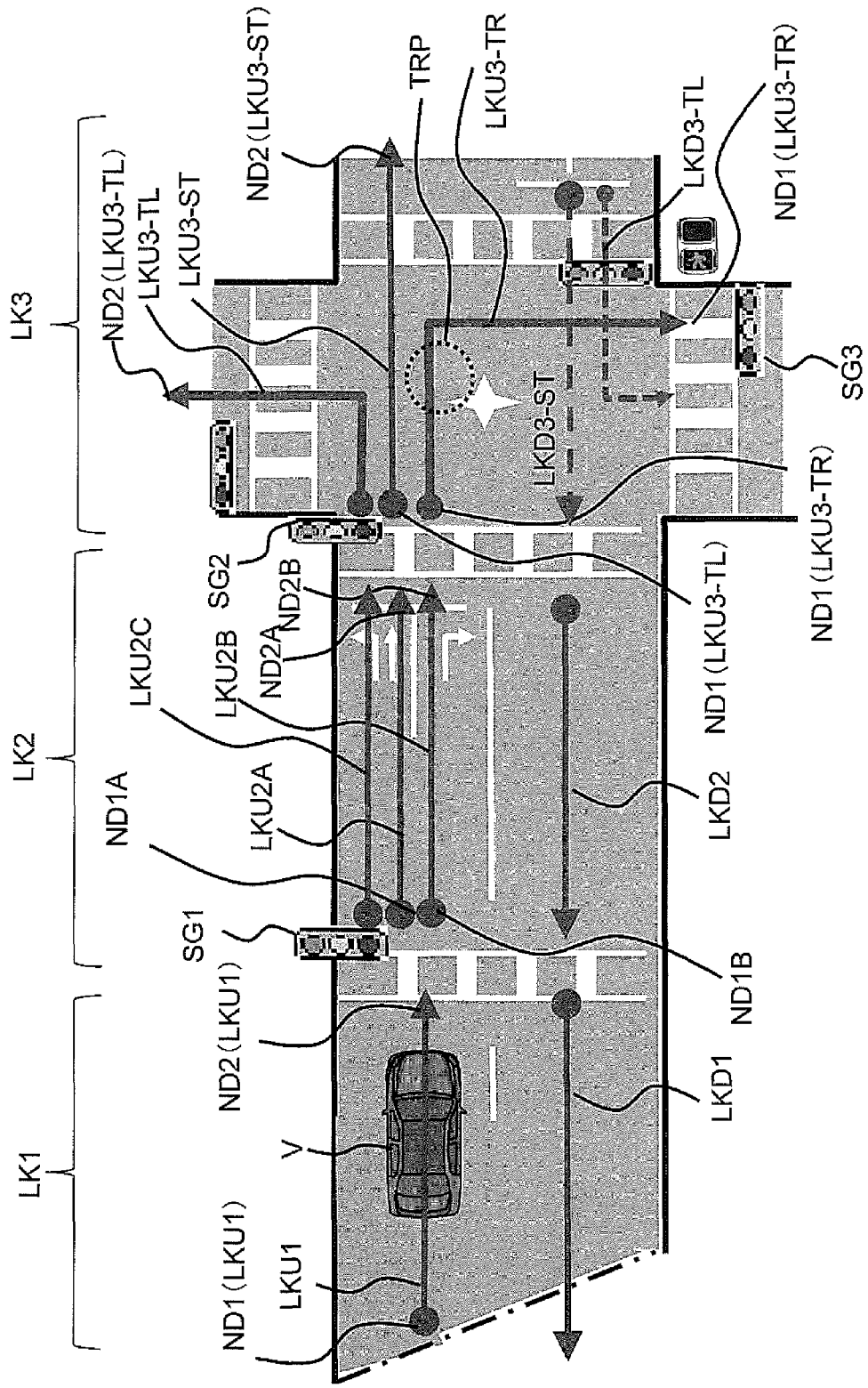
FIG. 3 is a view for describing a traffic situation in which several traffic signals are provided.

FIG. 3 is a view showing examples of the traveling link data and the traffic signal data at an actual intersection. As shown in FIG. 3, a traveling link LKD1 is set for a road on which a traveling link LKU1 is present for the own vehicle V to travel. Here, the traveling link LKU1 is a traveling link for the up lane while the traveling link LKD1 is a traveling link for the down lane, and both are assigned different identifiers as different traveling links. At the traveling direction side of the traveling link LKU1 for the own vehicle to travel, three traveling links LKU2A, LKU2B and LKU2C are present which are connected to the traveling link LKU1 at a node ND2. The traveling link LKU2A is a traveling link for a straight-ahead lane, the traveling link LKU2B is a traveling link for a right-turn lane, and the traveling link LKU2C is a traveling link for a left-turn lane. The traveling links LKU2A and LKU2C are defined as different traveling links because the connected links related thereto are different.

Figure 4:
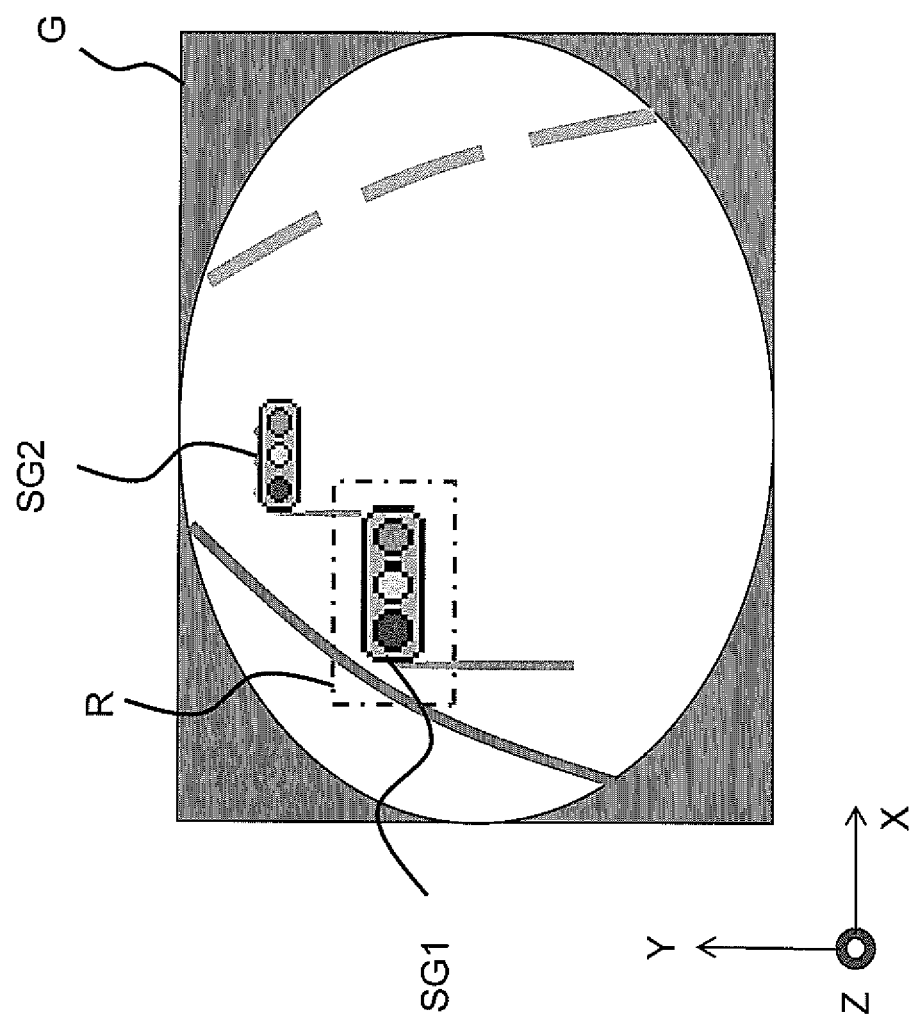
FIG. 4 is a view for describing a process of specifying a traffic signal to be targeted.

As shown in FIG. 4, when viewed forward from the own vehicle V shown in FIG. 3, both of a traffic signal SG1 and a traffic signal SG2 fall within the field of view (image capturing area) at the same time. It may be difficult to determine which traffic signal the own vehicle V should target. In such a situation, an erroneous process may possibly be performed (a traffic signal which should not be targeted may be erroneously specified), such as depending on the image recognition technique, in a process of specifying either one of the traffic signals. Note that the z-axis shown in FIG. 4 is the imaging direction.

While details will be described later, the traffic signal SG1 to be targeted can be specified and an image area R including this traffic signal SG1 can be extracted even when two traffic signals are concurrently included in the image capturing area as shown in FIG. 4. This is because the traffic signal recognition apparatus 100 according to the present embodiment is configured such that the traveling link is related to each traffic signal to be targeted, and in the example shown in FIG. 3, only the traffic signal SG1 is related to the traveling link LKU1 for the own vehicle V.

In other words, according to the present embodiment, one traffic signal to be targeted can be specified for one traveling link by referring to the traveling link data and the traffic signal data even in a situation in which several traffic signals are provided at an intersection to complicate the traffic situation. Hereinafter, descriptions will be directed to a method of traffic signal recognition according to the present embodiment which specifies one traffic signal to be targeted and recognizes the content presented by the traffic signal.

The control device 10 of the traffic signal recognition apparatus 100, which specifies a traffic signal to be targeted, is a computer comprising: a ROM (Read Only Memory) 12 which stores a program for recognizing the content of information presented by the traffic signal; a CPU (Central Processing Unit) 11 as an operational circuit which executes the program stored in the ROM to function as the traffic signal recognition apparatus 100; and a RAM (Random Access Memory) 13 which functions as an accessible storage.

The control device 10 of the traffic signal recognition apparatus 100 according to the present embodiment has an captured image acquisition function, an own vehicle position acquisition function, a target traffic signal specifying function, a traffic signal image area extraction function, and a traffic signal content recognition function. The control device 10 in the present embodiment executes each function by software for realizing the above functions together with the above-described hardware.

Each function executed by the traffic signal recognition apparatus 100 according to the present embodiment will be described below.

The captured image acquisition function executed by the control device 10 according to the present embodiment will first be described. The control device 10 acquires a captured image around the own vehicle captured by the camera 20.

The own vehicle position acquisition function executed by the control device 10 according to the present embodiment will then be described. The control device 10 acquires a current position of the own vehicle detected by the position detection device 30. The control device 10 also acquires, if any, attitude information about the own vehicle detected by the position detection device 30.

The target traffic signal device specifying function executed by the control device 10 is a function to refer to the map information 41 and to specify a traffic signal to be targeted by using information about the traveling link to which the current position of the own vehicle belongs. The control device 10 presumes the traveling link for the own vehicle to travel, using the traveling link data acquired from the map information 41 and the current position of the own vehicle acquired from the position detection device. The control device 10 presumes a traveling link related to the point or area to which the current position of the own vehicle belongs, as the traveling link for the own vehicle to travel. The control device 10 may presume a traveling link separated from the current position of the own vehicle by a minimum distance (the nearest traveling link) as the traveling link for the own vehicle to travel. When an attitude including the traveling direction of the own vehicle is acquired, a traveling link in which a difference between the traveling direction of the own vehicle and the direction of a vector directed from the start point of the traveling link to the end point is not more than a predetermined threshold, for example 90°, and the distance from the current position is minimum (i.e., the nearest traveling link), may be presumed as the traveling link for the own vehicle to travel.

When the traveling link data includes information about connected links which are connected to the traveling link (which are each to be transit), options of a traveling link to subsequently travel are narrowed down to connected links which are connected to the current traveling link. Therefore, among the traveling links narrowed down into the options, a traveling link separate from the current position by a minimum distance may be selected as a next traveling link to subsequently travel. This allows a correct presumption of a traveling link for the own vehicle to travel, even in a complex traffic situation in which the traffic signal to be targeted is different for each connected link as the transit to which the own vehicle subsequently proceeds. Thus, the traveling link for the own vehicle to turn right in the intersection and the traveling link for the own vehicle to go straight ahead in the intersection can be presumed without fail.

The control device 10 in the present embodiment refers to the traveling link data 411 of the map information 41 for the own vehicle to travel, and calculates the next traveling link to subsequently travel when it is determined that the own vehicle has reached the end point of the traveling link. Specifically, when a distance between the own vehicle and the end point of the directed link related to the traveling link has become shorter than a predetermined value, the control device 10 refers to the traveling link data 411 and calculates a connected link which is connected to the end point of the traveling link to which the current position of the own vehicle belongs.

Figure 5:
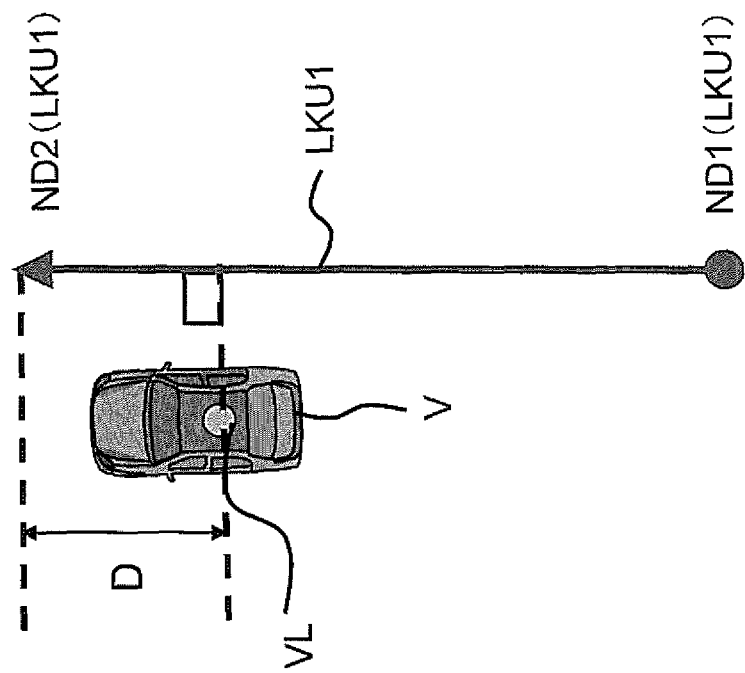
FIG. 5 is a view for describing the timing of a presumption process for a traveling link.

More specifically, as shown in FIG. 5, the distance to the end point node is calculated in comparison with the vector directed from the start point to the end point of the traveling link. And, when a distance D from the end point node ND2 of the traveling link LKU1 to the current position VL of the own vehicle V has become shorter than a predetermined value, the control device 10 presumes the next traveling link for the own vehicle V to subsequently travel at the timing when the own vehicle V has reached the end point of the traveling link LKU1.

The control device 10 in the present embodiment refers to the traveling link data 411 and/or the traffic signal data 412 which are related to each other in the map information 41, and specifies a traffic signal to be targeted which is related to the presumed traveling link for the own vehicle. The control device 10 identifies the traveling link ID for the own vehicle to travel and refers to the traffic signal data 412 related to the traveling link ID in the traveling link data 411, thereby specifying the traffic signal to be targeted by the own vehicle when traveling on the traveling link. Further, the control device 10 acquires, from the traffic signal data 412, the three-dimensional position information such as installation position and height of the specified traffic signal and its type, etc.

Next, the traffic signal image area extraction function executed by the control device 10 will be described. The control device 10 extracts an image area of the traffic signal from the captured image by the camera 20, on the basis of the position information about the specified traffic signal and the image capturing property information 42 about the camera 20. The control device 10 calculates the relative positional relationship of the traffic signal based on the camera 20 using geometrical relation, from the position of the own vehicle acquired by the own vehicle position acquisition function, the three-dimensional position information about the traffic signal to be targeted which is specified by the traffic signal specifying function, and the external parameters (image capturing property information 42) which include information about the attaching position of the camera 20 to the own vehicle.

The control device 10 in the present embodiment extracts the image area corresponding to an image of the traffic signal from the captured image, while taking into consideration the attitude of the own vehicle detected by the own vehicle position acquisition function. Thus, the attitude of the own vehicle is also taken into consideration thereby to allow the accurate extraction of the image area in which an image of the traffic signal. Specific processing is not limited, but may be designed such that the coordinate conversion is performed in accordance with the attitude of the own vehicle to obtain the image area of the traffic signal from the captured image when the image of the traffic signal is captured in the current attitude of the own vehicle.

When the own vehicle position acquisition function acquires only the position of the own vehicle, i.e., when information about the attitude of the own vehicle cannot be acquired, the control device 10 can use the traveling direction of the traveling link for the own vehicle to travel as the attitude of the own vehicle. In this case, the control device 10 can calculate the vehicle attitude by using the traveling direction of the traveling link. For example, in a traveling link having a curvature such as right turn and left turn, the vehicle attitude at the start point node and the vehicle attitude at the end point node are preliminarily included in the traveling link data of the map information 41, and the control device 10 calculates the distances from the position of the own vehicle to the start point node and the end point node of the traveling link. These calculated distances, which reflect the progressing percentage of the own vehicle in the traveling link, can be used to calculate the change in vehicle attitude at each position from the start point node to the end point node of the traveling link by the control device 10.

As previously described, the moving mechanism 21 for the camera 20 varies the imaging direction of the camera 20 on the basis of the position of the image area of the traffic signal in the captured image. With regard to the position of the image area of the traffic signal used when varying the imaging direction of the camera 20, it is preferred that not only the relative positional information about the traffic signal based on the current position of the camera 20 is calculated, but also the traveling information about the own vehicle such as vehicle speed and yaw rate of the own vehicle, and the estimated time required for a process to calculate the image area of the traffic signal, are taken into consideration to calculate the image area of a traffic signal which may be specified in the subsequent period. The traveling information about the own vehicle is acquired from the vehicle controller 60. After predicting the image area of a traffic signal when performing the subsequent process to specify the traffic signal, the moving mechanism 21 adjusts the imaging direction of the camera 20 so that the camera 20 can capture the predicted image area of the traffic signal. This allows the subsequent specifying of the traffic signal to be correctly performed.

Also as previously described, the camera 20 varies the image capturing magnification of the camera 20 on the basis of a ratio of the image area of the traffic signal with respect to the captured image. With regard to the ratio occupied by the image area of the traffic signal with respect to the entire area of the captured image, which ratio is used when varying the image capturing magnification of the camera 20, it is preferred that not only the relative positional information about the traffic signal based on the current position of the camera 20 is calculated, but also the traveling information about the own vehicle such as vehicle speed and yaw rate of the own vehicle, and the estimated time required for a process to calculate the image area of the traffic signal, are taken into consideration to calculate the image area of a traffic signal which may be specified in the subsequent period. After predicting the image area of a traffic signal when performing the subsequent process to specify the traffic signal, the moving mechanism 21 adjusts the image capturing magnification of the camera 20 so that the camera 20 can clearly capture the predicted image area of the traffic signal. This allows the subsequent recognition of the content of the traffic signal presented by the traffic signal to be correctly performed.

The control device 10 extracts an image area on the captured image (the image area of the traffic signal) in which the image of the specified traffic signal appears, using the relative position of the traffic signal based on the camera 20 and the internal parameters (the image capturing property information 42) including the lens distortion information regarding the camera 20. The center coordinate of the image area of the traffic signal may be obtained by performing projection conversion for the three-dimensional coordinates of the center part of the traffic signal (e.g., the center part of the yellow light in case of the red-yellow-green type traffic signal) into a coordinate system of the captured image by the camera 20. The size of the image area of the traffic signal may be set to any fixed size or be set in accordance with the type of the traffic signal, or the size may be varied in accordance with the distance from the own vehicle to the traffic signal. Although not particularly limited, the image area of the traffic signal may be set larger as the distance to the traffic signal is longer, and the image area of the traffic signal may be set shorter as the distance to the traffic signal is shorter so that the size of the image area of the traffic signal in the captured image falls within a predetermined area. The size of the image area of the traffic signal may be varied in accordance with the detection accuracy of the position detection device 30 in the own vehicle.

Finally, the traffic signal content recognition function executed by the control device 10 in the present embodiment will be described. The control device 10 in the present embodiment recognizes the traffic signal content presented by the traffic signal, on the basis of the image of the traffic signal included in the extracted image area. The control device 10 performs a process to recognize a traffic signal content presented by the traffic signal, for the image area of the traffic signal extracted by the traffic signal content recognition function, and acquires information presented by the traffic signal. The process to recognize the traffic signal content presented by the traffic signal is not particularly limited, but may be configured to: preliminarily store a template image for each information item presented by the traffic signal; perform template matching generally known in the field of image processing to specifically specify the image area of the traffic signal; and thereafter verify, by color recognition, the lighting state of each traffic signal (e.g., red/yellow/green) presented by the traffic signal to recognize the lightning color as the information presented by the traffic signal. The method of recognizing the traffic signal content is not particularly limited, and any method which has been known in the art at the time of filing of the present application may appropriately be used.

Control procedure in the traffic signal recognition apparatus 100 according to the present embodiment will then be described with reference to the flowchart of FIG. 6. The control device 10 having a function of traffic signal recognition sequentially executes process shown in FIG. 6 at a prescribed time interval, for example about 50 ms.

As shown in FIG. 6, the control device 10 acquires in step S110 the current position of the own vehicle detected by the position detection device 30.

In step S120, the control device 10 determines whether the own vehicle has reached the end point node of the traveling link on the basis of the position of the own vehicle which was acquired in step S110 and information about the traveling link which was determined, in the previous processing, that the own vehicle was traveling thereon (acquired vehicle position belonged thereto). The method of determination to be used herein may be the method as described with reference to FIG. 5. If it is determined that the own vehicle has reached the end point node, the routine proceeds to step S130, while if it is determined that the own vehicle has not reached the end point node, the routine continues the processing in steps S110 and S120.

In step S130, the control device 10 calculates a traveling link for the own vehicle to travel, on the basis of the current position of the own vehicle acquired in step S110 and the traveling link data 411 included in the map information 41, and the routine proceeds to step S140.

In step S140, the control device 10 uses the identifier (ID) of the traveling link calculated in step S130 and the map information 41 to specify a traffic signal to be targeted, on the basis of the traveling link to which the current position of the own vehicle belongs.

In step S150, the control device 10 calculates a relative position of the traffic signal with respect to the camera 20 by using: the position information, acquired with reference to the traffic signal data 412 of the map information 41, about the traffic signal specified in step S140; the current position of the own vehicle acquired in step S110; and the external parameters (the image capturing property information 42) of the camera 20 attached to the own vehicle.

In step S160, the control device 10 extracts an image area of the traffic signal from the captured image by the camera 20, on the basis of the position information about the specified traffic signal and the image capturing property information 42 about the camera 20.

In step S170, the control device 10 recognizes the traffic signal content of the traffic signal on the basis of the image of the traffic signal in the image area.

In step S180, the control device 10 sends the recognition result signal to the navigation apparatus 50, the vehicle controller 60, or the driving system 70. These on-vehicle apparatuses perform driving support in accordance with the traffic signal content presented by the traffic signal. Although not particularly limited, the driving support system 1 according to the present embodiment may execute the control to decrease the speed of the own vehicle when recognizing the stop sign or warning sign displayed by the traffic signal. When the stop sign or warning sign displayed by the traffic signal is recognized, the driving support system 1 according to the present embodiment may announce it by voice.

In step S220, the control device 10 varies the imaging direction of the camera 20 on the basis of the position, obtained in step S160, of the image area of the traffic signal from the captured image. This is because, when the image of the traffic signal is shifted from the center of the captured image, the imaging direction of the camera 20 may have to be corrected so that the entire image of the traffic signal can be acquired.

In the present embodiment, the image area of the traffic signal extracted in step S160 is utilized in step S210 to predict the image area of the traffic signal at the timing of a process to be performed in the subsequent period. And the imaging direction of the camera 20 is varied in step S220 on the basis of the position of the predicted image area of the traffic signal. Since the vehicle is traveling, it is supposed that the position of the image area of the traffic signal in the present processing period and the position of the image area of the traffic signal in the subsequent processing period (next period) are different. In the present embodiment, the traveling information about the own vehicle such as vehicle speed and yaw rate of the own vehicle, and the estimated time required for the process to calculate the image area of the traffic signal, are taken into account to calculate the image area of the traffic signal to be specified in the subsequent period.

The traffic signal recognition apparatus 100 according to the present embodiment has the following advantageous effects.

(1) The traffic signal recognition apparatus 100 of the present embodiment refers to the map information 41 to specify a traffic signal to be targeted by using the traveling link to which the current position of the own vehicle belongs. The map information 41 includes the traveling link data 411 and the traffic signal data 412. The traveling link data 411 is data defined by the directed link and related to information about the connected link and the traveling direction. The traffic signal data 412 is data related to the traveling link data. Therefore, even in a complex traffic situation in which several traffic signal are present, the traveling link for the own vehicle is correctly presumed, so that one traffic signal to be targeted by the driver can be correctly specified. In the present embodiment, the traveling link is defined by the directed link including the start point and the end point. This traveling link is set for each traffic lane on the road. In an intersection, this traveling link is set for each traveling direction information item, such as straight ahead, right turn or left turn. Therefore, even in a situation in a complex intersection, for example, as shown in FIG. 3, the traffic signal to be targeted by the own vehicle can be specified. In the present embodiment, the traveling link is related to information about the connected link to be subsequently connected therewith. Therefore, even when a plurality of traveling links are present on the same road, the traveling link to which the own vehicle belongs can be appropriately presumed. For example, when the vehicle turns left at the intersection in which the traffic signal SG2 is located as shown in FIG. 3, the left-turn traveling link LKU2C and the straight-ahead traveling link LKU2A are present on the same lane. However, the left-turn traveling link LKU2C is related to the connected link LKU3-TL as transit, while the straight-ahead traveling link LKU2A is related to the connected link LKU3-ST as transit, and therefore the traveling link LKU2C and the traveling link LKU2A can be correctly identified.

(2) According to the traffic signal recognition apparatus 100 of the present embodiment, the process to specify the traveling link is performed at the timing when the own vehicle has approached within a predetermined distance from the end point node, and the traveling link to subsequently travel can thus be correctly specified. For example, when the accuracy of detecting the current position of the own vehicle becomes low, it is possible to eliminate the selection of an incorrect connected link in the present embodiment.

(3) According to the traffic signal recognition apparatus 100 of the present embodiment, the attitude of the own vehicle is acquired, and the image area of the traffic signal is extracted in the vehicle attitude. Therefore, the position of the image area in which the image of the traffic signal can be accurately obtained.

(4) The traffic signal recognition apparatus 100 of the present embodiment employs an information form in which one traffic signal data item is relatively related to one traveling link data item. Therefore, one traffic signal to be targeted can be specified using the traveling link information which has been highly accurately presumed using information about the lane, directed link, connected link and traveling direction.

(5) In the traffic signal recognition apparatus 100 of the present embodiment, the camera 20 can be driven to move. Therefore, the camera 20 can capture an image of a traffic signal regardless of its location. For example, in a situation of the intersection environment as shown in FIG. 3 in which the vehicle waits to turn right at the point TRP of the traveling link LKU3-TR, the camera 20 can capture an image of the traffic signal SG3, which would be out of the field of view if using an ordinary camera for capturing an image viewed forward. A driven-type camera having a narrow angle of view may preferably be used because in this case the possibility of capturing a traffic signal not to be targeted can be reduced thereby to eliminate incorrect recognition in comparison with using a camera having a wide angle of view.

(6) In the traffic signal recognition apparatus 100 of the present embodiment, the camera 20 has a zoom function and performs the control of increasing and decreasing the image capturing magnification in accordance with the size of the image area of the traffic signal. Therefore, the size of the image area of the traffic signal in the captured image can be appropriately maintained regardless of the relationship of distance from the traffic signal. This allows the risk of capturing another traffic signal to be further reduced. Moreover, the accuracy of the traffic signal recognition process can be enhanced because the size of the image area of the traffic signal as a recognition object is approximately constant.

Embodiments heretofore explained are described to facilitate understanding of the present invention and are not described to limit the present invention. Therefore, it is intended that the elements disclosed in the above embodiments include all design changes and equivalents to fall within the technical scope of the present invention.

That is, in the present description, the driving support system 1 is described as an example which comprises the traffic signal recognition apparatus 100 according to the present invention, the navigation apparatus 50, the vehicle controller 60, and the driving system 70, but the present invention is not limited thereto.

In the present description, the traffic signal recognition apparatus 100 comprising the control device 10, the camera 20 as an image capturing unit, the position detection device 30, and the database 40 is described as an example of an embodiment of the traffic signal recognition apparatus according to the present invention, but the present invention is not limited thereto.

In the present description, the traffic signal recognition apparatus 100 having the control device 10 which executes the captured image acquisition function, the own vehicle position acquisition function, the target traffic signal specifying function, the traffic signal image area extraction function, and the traffic signal content recognition function is described as an example of the traffic signal content recognition apparatus according to the present invention which comprises a captured image acquisition unit, an own vehicle position acquisition unit, a target traffic signal specifying unit, a traffic signal image area extraction unit, and a traffic signal content recognition unit, but the present invention is not limited thereto.

The invention claimed is:

1. A traffic signal recognition apparatus comprising:
a captured image acquisition unit configured to acquire a captured image around an own vehicle from an image capturing unit on-vehicle;

an own vehicle position acquisition unit configured to acquire a current position of the own vehicle;
a target traffic signal specifying unit configured to:
refer to map information;
calculate a next traveling link by using a traveling link, the traveling link being a link to which the current position of the own vehicle belongs, the next traveling link being a link to which the own vehicle travels next after the traveling link; and
specify a traffic signal to be targeted when traveling on the next traveling link;
a traffic signal image area extraction unit configured to extract an image area of the traffic signal from the captured image by using position information about the specified traffic signal and image capturing property information about the image capturing unit; and
a traffic signal content recognition unit configured to recognize a traffic signal content of the traffic signal by using an image of the traffic signal included in the extracted image area, wherein
the map information includes traveling link data and traffic signal data,
the traveling link data includes:
the traveling link which is defined for each traffic lane by a directed link including a start point, an end point and an up direction or a down direction;
a connected link which is connected with each of the start point and the end point of the directed link; and
traveling direction information which specifies a traveling direction including straight ahead or right turn or left turn,
the traveling link, the connected link and the traveling direction information being related to one another,
the traffic signal data is related to the traveling link, and
the traffic signal data includes the position information about the traffic signal to be targeted when traveling on the traveling link.

2. The traffic signal recognition apparatus according to claim 1, wherein the target traffic signal specifying unit configured to
refer to the traveling link data for the own vehicle to travel,
calculate the next traveling link when a distance between the own vehicle and the end point of the directed link related to the traveling link is shorter than a predetermined value, and,
specify the traffic signal to be targeted when traveling on the next traveling link.

3. The traffic signal recognition apparatus according to claim 1, wherein
the own vehicle position acquisition unit is configured to acquire an attitude of the own vehicle at the current position and
the traffic signal image area extraction unit is configured to extract the image area of the traffic signal from the captured image in accordance with the acquired attitude of the own vehicle.

4. The traffic signal recognition apparatus according to claim 1, wherein
one item of the traveling link data is respectively related to one item of the traffic signal data.

5. The traffic signal recognition apparatus according to claim 1, wherein
the image capturing unit comprises a moving mechanism which is configured to vary an imaging direction of the image capturing unit and
the moving mechanism is configured to vary the imaging direction of the image capturing unit in accordance with a position of the image area of the traffic signal in the captured image.

6. The traffic signal recognition apparatus according to claim 1, wherein
the image capturing unit has a zoom function, and
the zoom function of the image capturing unit includes a control function of an image capturing magnification which is controlled on the basis of a surface ratio of the image area of the traffic signal with respect to the image area of the captured image.

7. A traffic signal recognition apparatus comprising:
a camera which is mounted on an own vehicle;
a position detection device; and
a control device, wherein
the camera is configured to capture an image around the own vehicle,
the position detection device is configured to detect a current position of the own vehicle,
the control device is configured to:
refer to map information stored in a database;
calculate a next traveling link by using a traveling link, the travelling link being a link to which the detected current position of the own vehicle belongs, the next travelling link being a link to which the own vehicle travels next after the traveling link;
specify a traffic signal to be targeted when traveling on the next traveling link;
extract an image area of the traffic signal from the captured image by using position information about the specified traffic signal and image capturing property information about the camera; and
recognize a traffic signal content of the traffic signal by using an image of the traffic signal included in the extracted image area,
the map information includes traveling link data and traffic signal data,
the traveling link data includes:
a traveling link which is defined for each traffic lane by a directed link including a start point, an end point and an up direction or a down direction;
a connected link which is connected with each of the start point and the end point of the directed link; and
traveling direction information which specifies a traveling direction including straight ahead or right turn or left turn,
the traveling link, the connected link and the traveling direction information being related to one another,
the traffic signal data is related to the traveling link, and
the traffic signal data includes the position information about the traffic signal to be targeted when traveling on the traveling link.

* * * * *